US012767048B2

(12) United States Patent
Cammenga et al.

(10) Patent No.: US 12,767,048 B2
(45) Date of Patent: Oct. 20, 2026

(54) CONNECTION SYSTEM FOR HEATER AND ELECTRO-OPTIC ASSEMBLY

(71) Applicant: Gentex Corporation, Zeeland, MI (US)

(72) Inventors: David J. Cammenga, Holland, MI (US); James P. Dratz, Zeeland, MI (US); Brandon W. Watt, Byron Center, MI (US); Taylor A. Warczinsky, Wyoming, MI (US); Craig Kendall, Grand Haven, MI (US)

(73) Assignee: GENTEX CORPORATION, Zeeland, MI (US)

( * ) Notice: Subject to any disclaimer, the term of this patent is extended or adjusted under 35 U.S.C. 154(b) by 287 days.

(21) Appl. No.: 18/599,894

(22) Filed: Mar. 8, 2024

(65) Prior Publication Data

US 2024/0300414 A1 Sep. 12, 2024

Related U.S. Application Data

(60) Provisional application No. 63/489,532, filed on Mar. 10, 2023.

(51) Int. Cl.
*B60R 1/00* (2022.01)
*B60R 1/12* (2006.01)
*G02F 1/03* (2006.01)

(52) U.S. Cl.
CPC ................ *B60R 1/006* (2013.01); *B60R 1/12* (2013.01); *G02F 1/0311* (2013.01)

(58) Field of Classification Search
CPC ...................................................... B60R 1/006
See application file for complete search history.

(56) References Cited

U.S. PATENT DOCUMENTS

| | | | | |
|---|---|---|---|---|
| 5,716,536 | A | 2/1998 | Yokoto et al. | |
| 6,426,485 | B1 | 7/2002 | Bulgajewski et al. | |
| 2005/0270621 | A1* | 12/2005 | Bauer | B60R 1/088 359/265 |
| 2006/0215413 | A1 | 9/2006 | Mathieu et al. | |
| 2011/0168687 | A1* | 7/2011 | Door | B60R 1/0602 219/202 |
| 2020/0064704 | A1 | 2/2020 | Kendall et al. | |

* cited by examiner

*Primary Examiner* — Edmond C Lau
(74) *Attorney, Agent, or Firm* — Price Heneveld LLP; Brian James Brewer

(57) ABSTRACT

A mirror assembly includes an electro-optic assembly that has a front element substrate having a first surface and a second surface opposite the first surface. The electro-optic assembly further has a second element substrate having a third surface and a fourth surface opposite the third surface, the second and third surfaces facing each other to define a gap. A first electrode is coupled to the second surface and a second electrode is coupled to the third surface. An electro-optic medium is located between the first electrode and the second electrode. The mirror assembly further includes a heating assembly that has a heating trace distributing warmth along an area of the heating assembly, a first conductive trace, and a second conductive trace. A first conductive intermediary electrically couples the first conductive trace to the first electrode and a second conductive intermediary electrically couples the second conductive trace to the second electrode.

20 Claims, 16 Drawing Sheets

CONNECTION SYSTEM FOR HEATER AND ELECTRO-OPTIC ASSEMBLY

CROSS-REFERENCE TO RELATED APPLICATION

This application claims priority to and the benefit under 35 U.S.C. § 119(e) of U.S. Provisional Application No. 63/489,532, filed on Mar. 10, 2023, entitled "CONNECTION SYSTEM FOR HEATER AND ELECTRO-OPTIC ASSEMBLY," the disclosure of which is hereby incorporated herein by reference in its entirety.

FIELD OF THE DISCLOSURE

The present disclosure generally relates to a connection system for a heater and an electro-optic assembly, and, more particularly, to a connection system that includes a pair of traces that extend along a heating assembly and are electrically coupled to an electro-optic assembly.

SUMMARY OF THE DISCLOSURE

According to one aspect of the present disclosure, a mirror assembly for a vehicle includes an electro-optic assembly that has a front element substrate having a first surface and a second surface opposite the first surface. The electro-optic assembly further has a second element substrate having a third surface and a fourth surface opposite the third surface, the second and third surfaces facing each other to define a gap. A first electrode is coupled to the second surface and a second electrode is coupled to the third surface. An electro-optic medium is located between the first electrode and the second electrode. The mirror assembly further includes a heating assembly that defines an outer perimeter including a pair of conductive pathways, each of the conductive pathways includes one of a via located within the outer perimeter and extending entirely through the heating assembly or a notch defined by the outer perimeter. A heating trace distributes warmth along an area of the heating assembly. A first conductive trace and a second conductive trace each extend to one of the conductive pathways. A first conductive intermediary is located in one of the conductive pathways and electrically couples the first conductive trace to the first electrode and a second conductive intermediary is located in the other of the conductive pathways and electrically couples the second conductive trace to the second electrode.

According to another aspect of the present disclosure, a mirror assembly for a vehicle includes an electro-optic assembly that has a front element substrate having a first surface and a second surface opposite the first surface. The electro-optic assembly further has a second element substrate having a third surface and a fourth surface opposite the third surface, the second and third surfaces facing each other to define a gap. A first electrode is coupled to the second surface and a second electrode is coupled to the third surface. An electro-optic medium is located between the first electrode and the second electrode. The mirror assembly further includes a heating assembly that defines an outer perimeter including a pair of conductive pathways, each of the conductive pathways includes one of a via or an opening. A heating trace distributes warmth along an area of the heating assembly. A first conductive trace and a second conductive trace each extend to one of the conductive pathways. A first conductive intermediary is located in one of the conductive pathways and electrically couples the first conductive trace to the first electrode and a second conductive intermediary is located in the other of the conductive pathways and electrically couples the second conductive trace to the second electrode.

According to yet another aspect of the present disclosure, a mirror assembly for a vehicle includes an electro-optic assembly that has a front element substrate having a first surface and a second surface opposite the first surface. The electro-optic assembly further has a second element substrate having a third surface and a fourth surface opposite the third surface, the second and third surfaces facing each other to define a gap. A first electrode is coupled to the second surface and a second electrode is coupled to the third surface. An electro-optic medium is located between the first electrode and the second electrode. The mirror assembly further includes a heating assembly that defines an outer perimeter including a pair of conductive pathways. A heating trace distributes warmth along an area of the heating assembly. A first conductive trace and a second conductive trace each extend to one of the conductive pathways. A first conductive intermediary is located in one of the conductive pathways and electrically couples the first conductive trace to the first electrode and a second conductive intermediary is located in the other of the conductive pathways and electrically couples the second conductive trace to the second electrode.

These and other features, advantages, and objects of the present disclosure will be further understood and appreciated by those skilled in the art by reference to the following specification, claims, and appended drawings.

DETAILED DESCRIPTION

Figure 1:
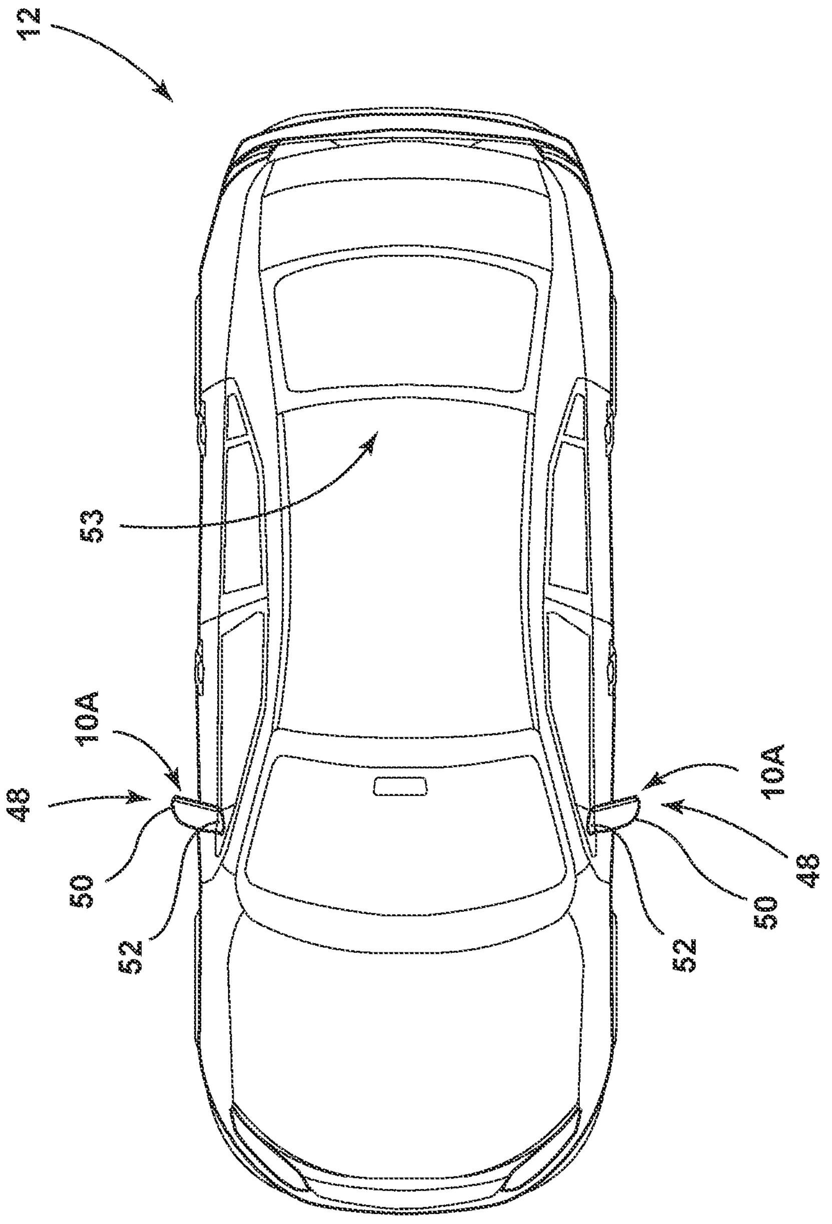
FIG. 1 is a top view of a vehicle with a mirror assembly of a first construction in accordance with an aspect of the present disclosure.

The present illustrated embodiments reside primarily in combinations of method steps and apparatus components related to a connection system that includes a pair of traces that extend along a heating assembly and are electrically coupled to an electro-optic assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to the surface of the device closer to an intended viewer of the device, and the term "rear" shall refer to the surface of the device further from the intended viewer of the device. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Figure 2A:
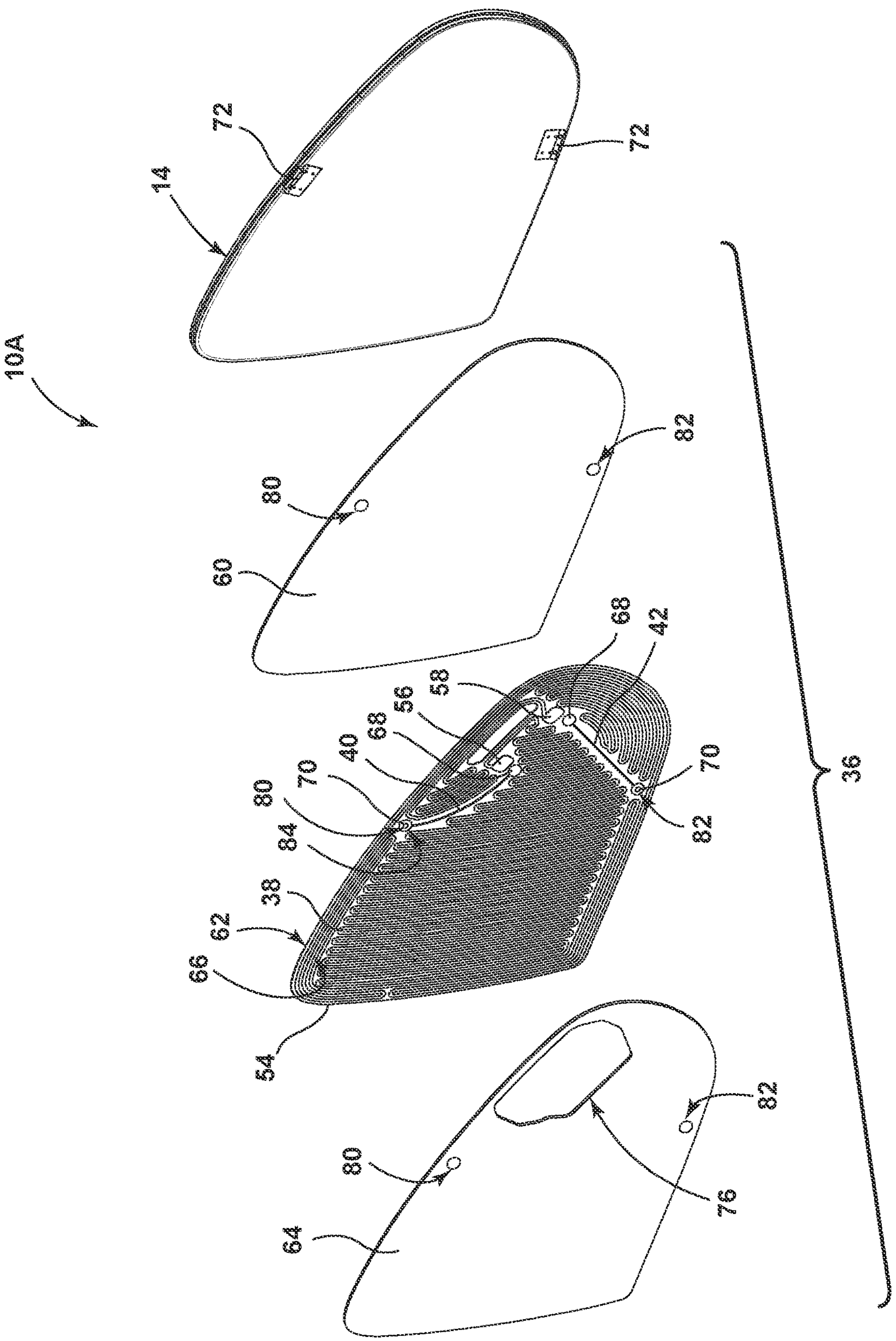
FIG. 2A is a disassembled view of a mirror assembly of a first construction in accordance with an aspect of the present disclosure.
Figure 2B:
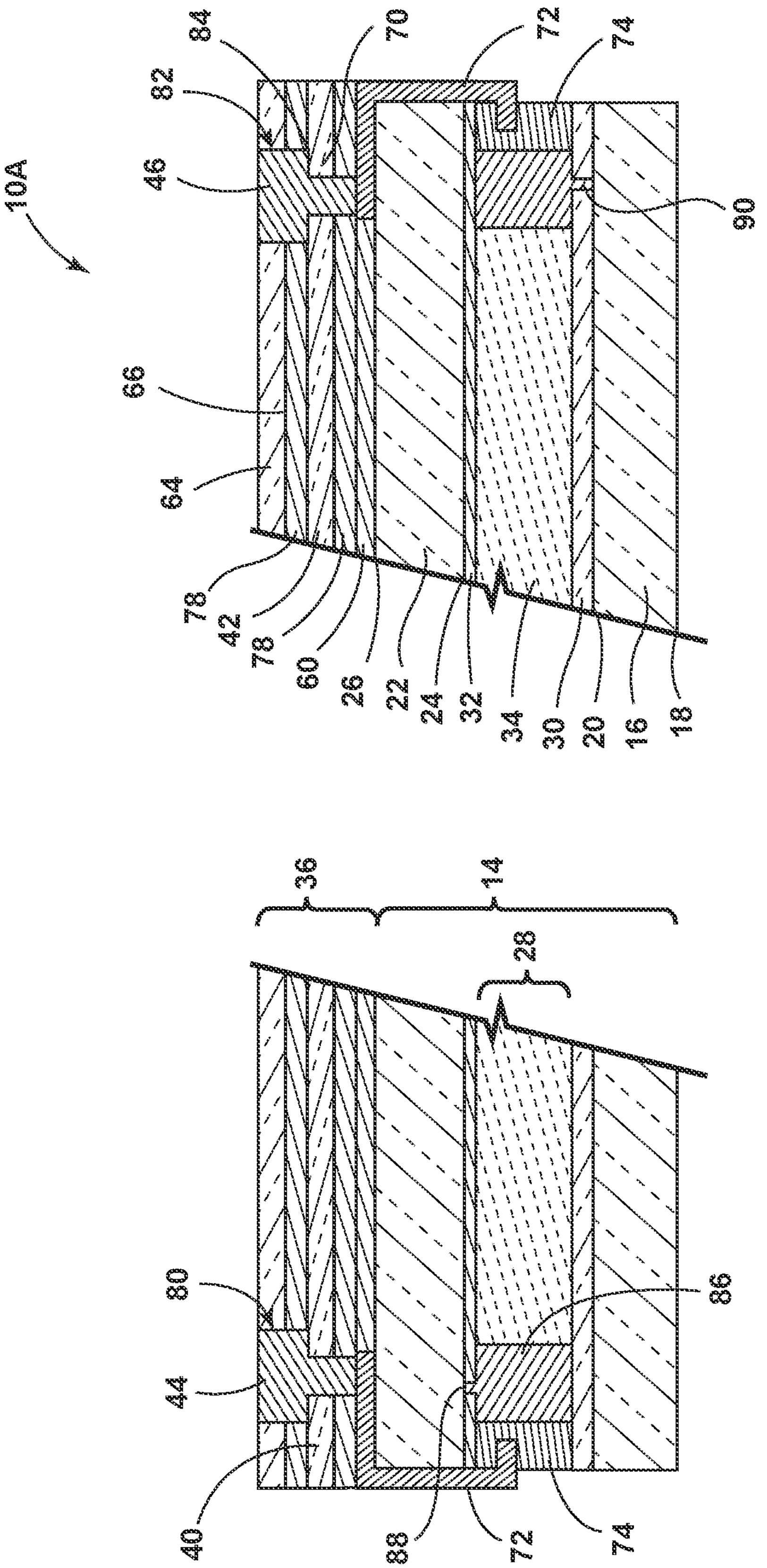
FIG. 2B is a cross-sectional view of a mirror assembly of a first construction in accordance with an aspect of the present disclosure.

Referring to FIGS. 1-2B, reference numeral 10A generally designates a mirror assembly 10A of a first construction for a vehicle 12. The mirror assembly 10A includes an electro-optic assembly 14 that has a front element substrate 16 having a first surface 18 and a second surface 20 opposite the first surface 18. The electro-optic assembly 14 further has a second element substrate 22 having a third surface 24 and a fourth surface 26 opposite the third surface 24, the second and third surfaces 20, 24 facing each other to define a gap 28. A first electrode 30 is coupled to the second surface 20, and a second electrode 32 is coupled to the third surface 24. An electro-optic medium 34 is located between the first electrode 30 and the second electrode 32. The mirror assembly 10A further includes a heating assembly 36 that has a heating trace 38 distributing warmth along an area of the heating assembly 36, a first conductive trace 40, and a second conductive trace 42. A first conductive intermediary 44 electrically couples the first conductive trace 40 to the first electrode 30, and a second conductive intermediary 46 electrically couples the second conductive trace 42 to the second electrode 32.

With reference now to FIG. 1, the mirror assembly 10A may be incorporated in various structures. For example, the mirror assembly 10A may be incorporated in a side mirror 48 (e.g., a pair of side mirrors 48) for connection to one or more sides of the vehicle 12. For example, the side mirror 48 may include a housing 50 and a mounting member 52 that connects the housing 50 to an exterior 53 (e.g., side) of the vehicle 12. However, the mirror assembly 10A may be incorporated into any other structure (e.g., an aircraft, water vessel, architecture) that includes a mirror or window with a heating system, or an electro-optic component. The electro-optic assembly 14 may be switchable between various degrees of transmissiveness and/or reflectiveness.

With reference now to FIGS. 2A and 2B, the heating assembly 36 includes an outer perimeter 54 and the heating trace 38 extends along a path within the outer perimeter 54 that covers a substantial part (e.g., 35% or more, 40% or more, 50% or more, 75% or more, or 75% or less) of the area defined by the outer perimeter 54. The heating trace 38 extends between a first heating conduction terminal 56 and a second heating conduction terminal 58. A power source (e.g., a PCB with an input, such as a trace, to both the heater assembly 36 and the electro-optic assembly 14 and a single or multiple wire harnesses) distributes power to the heating conduction terminals 56, 58 via direct contact or an intermediary. The intermediary may include one or more of connection clips, a different type of conductor, such as a wire, ink, bus, paste, solder, conductive springs 55 (FIGS. 8A-8C), or adhesive. In this manner, a full conduction loop (e.g., a heating loop) is formed by the heating trace 38 and the power source. The heating assembly 36 further includes a first heater substrate 60 overlaying a front surface 62 of the heating trace 38 and the conductive traces 40, 42 and a second heater substrate 64 overlaying a rear surface 66 of the heating trace 38 and the conductive traces 40, 42. Each of the heater substrates 60, 64 and the heating trace 38 may extend substantially to the outer perimeter 54.

With continued reference to FIGS. 2A and 2B, the first conductive trace 40, and the second conductive trace 42 may each extend between an electro-optic connection input terminal 68 and an electro-optic output terminal 70. In some embodiments, the electro-optic input and output terminals 68, 70 may be formed of copper. Each of the electro-optic connection input terminals 68 may be located proximate the heating conduction terminals 56, 58 such that the power source may distribute power to both the heating assembly 36 and the electro-optic assembly 14 (e.g., through different wires within a harness). Each of the electro-optic output terminals 70 may be located proximate the outer perimeter 54 of the heating assembly 36. The first and second conductive intermediaries 44, 46 electrically couple the electro-optic output terminals 70 to the first and second electrodes 30, 32 either directly or by one or more conductive structures which may extend around or proximate to the edge of the second element substrate. For example, the conductive structures may include one or more of conductive clips 72, other metal structures, conductive coating, conductive ink, solder, conductive epoxy, conductive paste, conductive adhesive, conductive tape, buses 74 (FIG. 2B), conductive springs 55 (FIGS. 8A-8C), and/or combinations thereof. In this manner, the first and second conductive intermediaries 44, 46 may extend between the electro-optic output terminals 70 to the conductive structures and the conductive structures may connect directly between the electro-optic output terminals 70 and the electrodes 30, 32. For example, the electro-optic output terminals 70 may extend directly above the conductive clip 72 and the conductive intermediaries 44, 46 may include a solder directly electrically coupling the electro-optic output terminals 70 to the conductive clip 72.

With continued reference to FIGS. 2A and 2B, the second heater substrate 64 may define an aperture 76 (FIG. 2A) that exposes the electro-optic connection input terminals 68 and the heating conduction terminals 56, 58 for connecting the power source thereto. The heating assembly 36 may further include a layer of adhesive 78 located between each of the heater substrates 60, 64 and may further be located in spaces between the heating trace 38 and the conductive traces 40, 42. The heating assembly 36 defines a pair of conductive pathways that may include a first via 80 and a second via 82. More particularly, each of the vias 80, 82 may extend through the heater substrates 60, 64 and the conductive traces 40, 42 (e.g., in alignment with the electro-optic output terminals 70). The first and second conductive intermediaries 44, 46 extend through a respective one of the vias 80, 82 to electrically couple the electro-optic output terminals 70 to the first and second electrodes 30, 32 either directly or by the one or more conductive structures. The vias 80, 82 may each include a larger profile in the second heater substrate 64 than around the electro-optic output terminals 70 such that the conductive intermediaries 44, 46 are in contact with a rear surface 84 of the electro-optic output terminals 70. The electro-optic output terminals 70 may be wider than the conductive traces 40, 42 to encircle the vias 80, 82 and facilitate sufficient electric coupling between the conductive intermediaries 44, 46 and the rear surface 84 of the electro-optic output terminals 70.

With reference now to FIG. 2B, in some embodiments, the conductive intermediaries 44, 46 extend through the vias 80, 82 into contact with a respective surface of the conductive clips 72. The conductive clips 72 may extend around the fourth surface 26 of the electro-optic assembly 14 and wrap around an outer edge to the third surface 24 to electrically couple to the electrodes 30, 32 (e.g., the bus 74). The bus 74 may be configured as an epoxy (e.g., a silver epoxy) that extends between and is in direct contact with both electrodes 30, 32. The bus 74 may include a pair of buses 74 that each extends along at least 40% (e.g., at least 50%, at least 60%, at least 70%, at least 80%, at least 90%) of an outer electrode perimeter. A seal 86 may be located at least partially inboard from the bus 74 to confine the electro-optic medium 34 within the gap 28. A first isolation line 88 may be defined in the first electrode 30 adjacent to one of the buses 74 and a second isolation line 90 may be defined in the second electrode 32 adjacent to the other bus 74. In this manner, each bus 74 may only distribute power to one of the electrodes 30, 32. In some embodiments, at least one of the conductive clips 72 and the buses 74 may be configured as a conductive spring 55 that is outward biased into contact with the electrodes 30, 32. A concealment layer (not shown), such as an opaque ring or a chrome ring may be located between the seal 86 and the front element substrate 16.

Figure 2C:
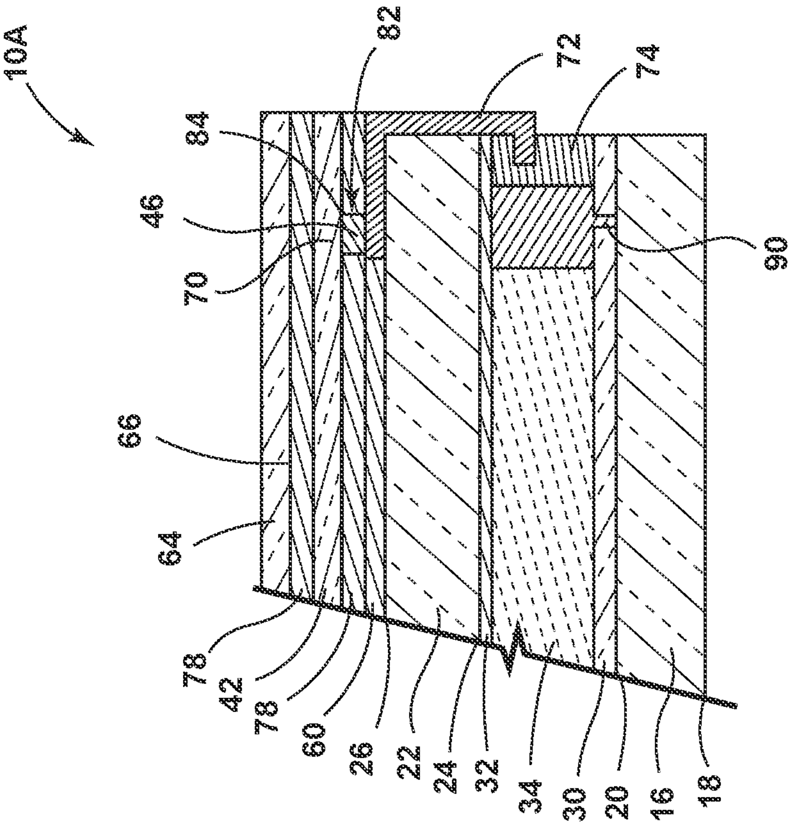
FIG. 2C is a cross-sectional view of a mirror assembly of a first construction and a modified arrangement in accordance with an aspect of the present disclosure.

With reference now to FIG. 2C, the vias 80, 82 may only be present in the first heater substrate 60 (or a notch 92, 94) and the first conductive intermediary 44, as shown, and/or the second conductive intermediary (e.g., conductive ink, conductive epoxy, conductive paste, solder, conductive adhesive, conductive tape) extend through the vias 80, 82 and electrically couple to the electrodes 30, 32 directly through a conductive structure, such as the clip 72. In this manner, the first conductive intermediary 44 and/or second conductive intermediary may be deposited prior to assembly.

With reference now to FIGS. 2A-2C, the conductive intermediaries 44, 46 may include a variety of configurations. For example, each conductive intermediary 44, 46 may be formed of a paste, epoxy, foam, tape, adhesive, ink, solder, conductive spring 55, mechanical conductor (e.g., a rivet, bolt, pin, or clip), and/or the like. The conductive intermediary may be isotropic, anisotropic, curable, non-curable, exhibit high or low durometer characteristics pre- or post-curing. While FIGS. 2B and 2C illustrate the clip 72 on the same plane as the first heater substrate 60, it should be appreciated that the first heater substrate 60 may overlay a top of the clip 72 and extend over the clip 72 such that the vias 80, 82 extend through the first heater substrate 60 into direct contact with the clip 72 (or other conductive structures) as illustrated in FIG. 2A.

Figure 3A:
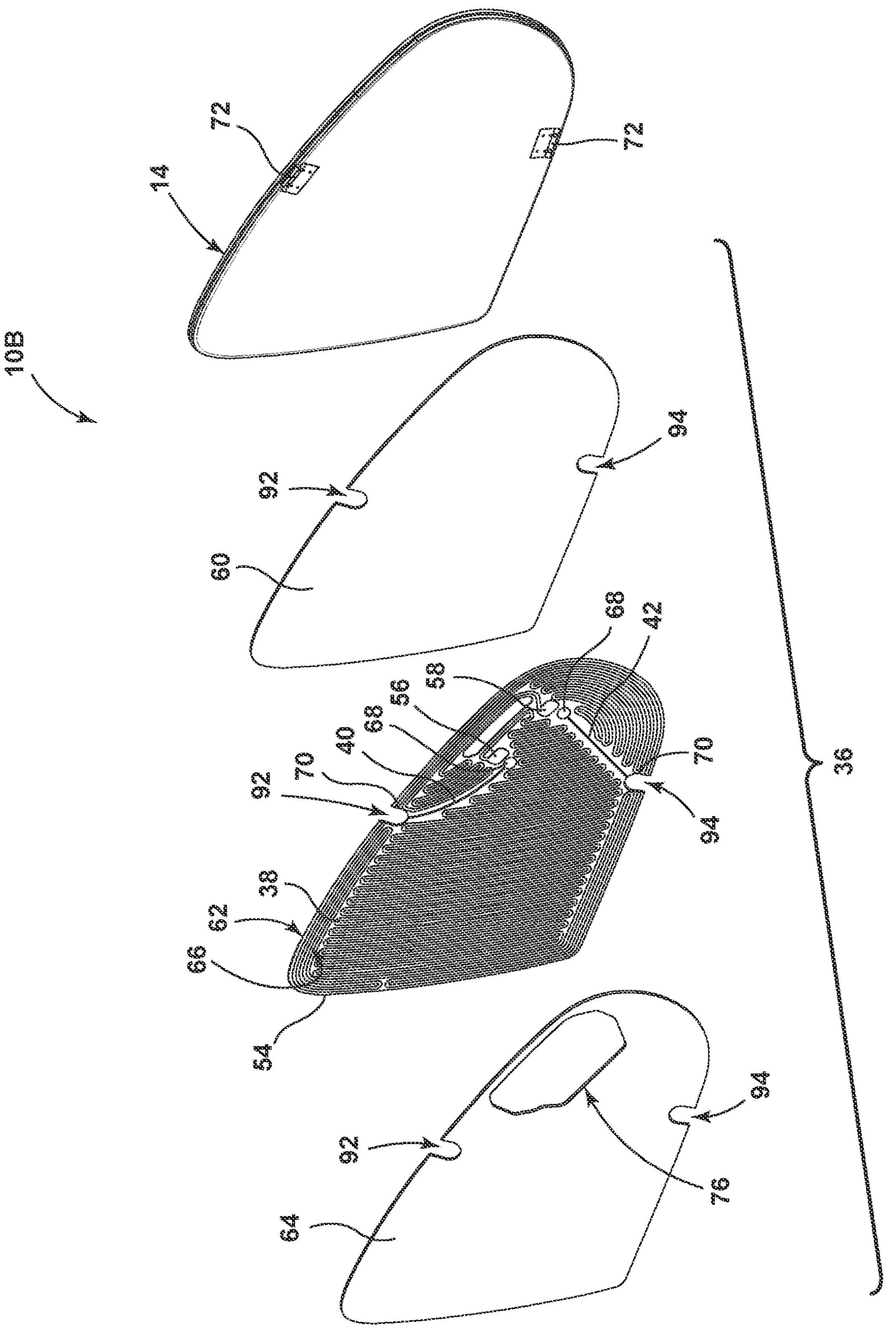
FIG. 3A is a disassembled view of a mirror assembly of a second construction in accordance with an aspect of the present disclosure.
Figure 3B:
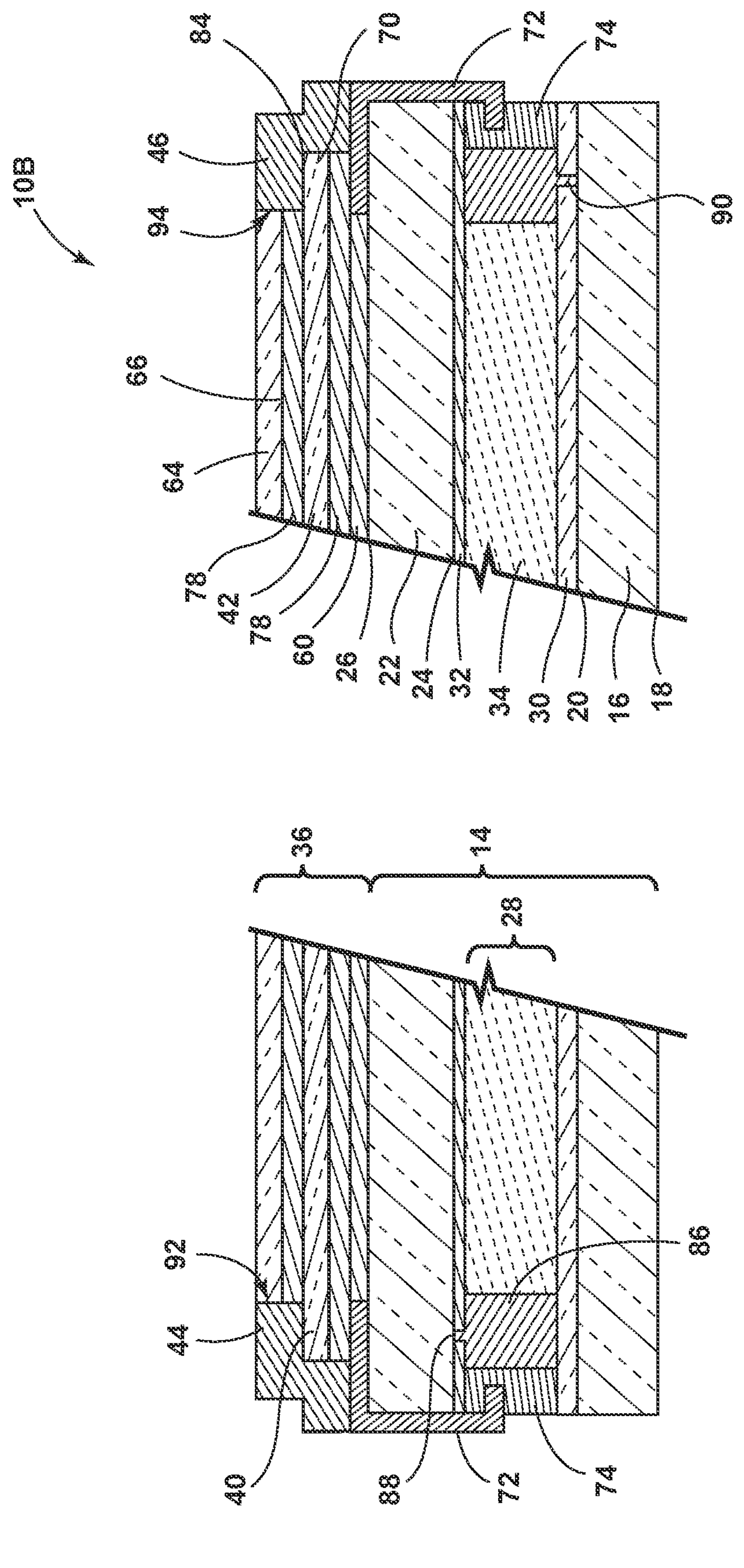
FIG. 3B is a cross-sectional view of a mirror assembly of a second construction in accordance with an aspect of the present disclosure.

With reference now to FIGS. 3A and 3B, a mirror assembly 10B is illustrated in accordance with a second construction. Unless otherwise expressly indicated, the mirror assembly 10B of the second construction may share all the same features, elements, materials, and functionalities, and be incorporated into the same structures as the other constructions described herein. However, rather than including vias 80, 82, the conductive pathways include notches 92, 94 are defined by the outer perimeter 54. It should be appreciated that, unless otherwise indicated, the outer perimeter 54 may include only the first heater substrate 60, only the second heater substrate 64, or both heater substrates 60, 64. In this manner, when the notches 92, 94 are defined by the outer perimeter 54, the notches 92, 94 may be defined by only the first heater substrate 60, only the second heater substrate 64, or both heater substrates 60, 64. In some embodiments, the notches 92, 94 may further be defined by the a pattern of the heating trace 38. More particularly, a first notch 92 may be aligned with one of the electro-optic output terminals 70 and a second notch 94 may be aligned with the other of the electro-optic output terminal 70. Each of the electro-optic output terminals 70 may extend along at least part of the outer perimeter 54 within the notches 92, 94. In some embodiments, the electro-optic output terminals 70 may be branched and extend in opposite directions along at least part of the outer perimeter 54 within the notches 92, 94. The conductive intermediaries 44, 46 electrically couple the electro-optic output terminals 70 to the first and second electrodes 30, 32 either directly or by the one or more conductive structures (e.g., conductive clips 72, buses 74, conductive spring 55). The first and second conductive intermediaries 44, 46 may extend between the electro-optic output terminals 70 to the conductive structures, and the conductive structures may connect directly between the electro-optic output terminals 70 and the electrodes 30, 32. In some embodiments, the notches 92, 94 may each include a larger profile in the second heater substrate 64 than around the electro-optic output terminals 70 such that the conductive intermediaries 44, 46 are in contact with the rear surface 84 of the electro-optic output terminals 70 to further facilitate sufficient electric coupling between the conductive intermediaries 44, 46 and the rear surface 84 of the electro-optic output terminals 70.

Figure 4A:
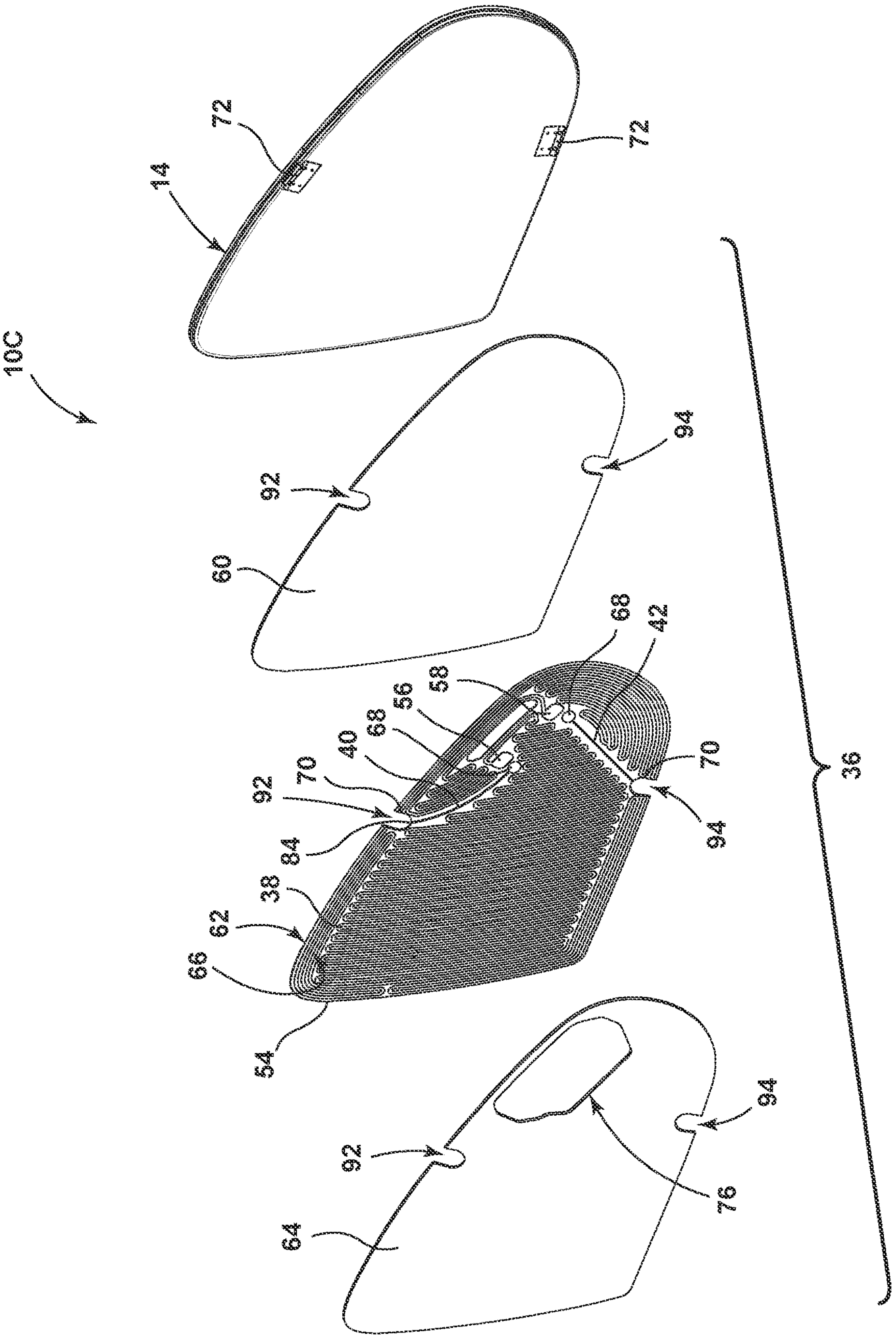
FIG. 4A is a disassembled view of a mirror assembly of a third construction in accordance with an aspect of the present disclosure.
Figure 4B:
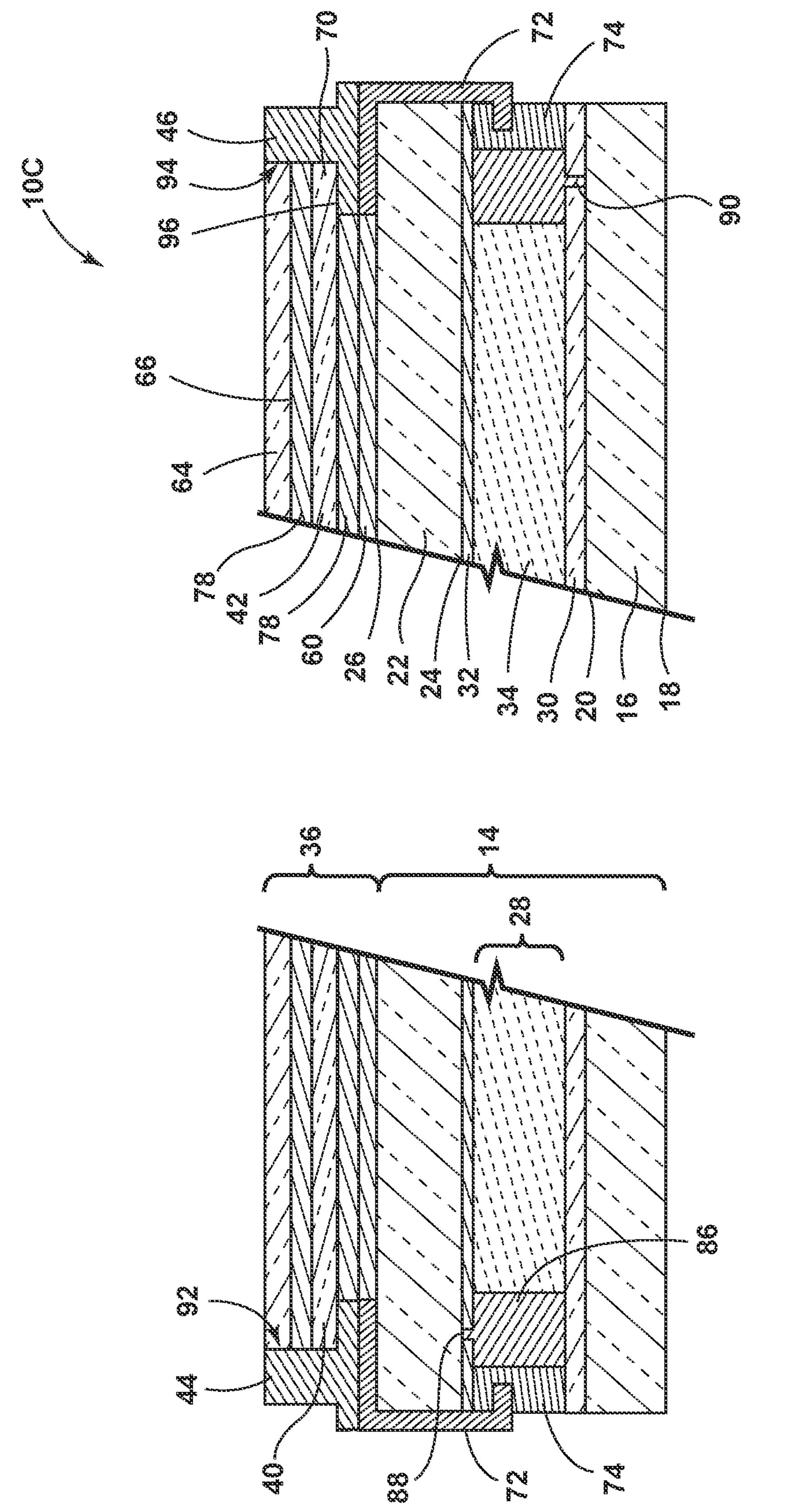
FIG. 4B is a cross-sectional view of a mirror assembly of a third construction in accordance with an aspect of the present disclosure.

With reference now to FIGS. 4A and 4B, a mirror assembly 10C is illustrated in accordance with a third construction. Unless otherwise expressly indicated, the mirror assembly 10C of the third construction may share all the same features, elements, materials, and functionalities, and be incorporated into the same structures as the other constructions described herein. However, the notches 92, 94 may each include a larger profile in the first heater substrate 60 than around the electro-optic output terminals 70 such that the conductive intermediaries 44, 46 are in contact with a front surface 96 of the electro-optic output terminals 70 to facilitate sufficient electric coupling between the conductive intermediaries 44, 46 and the front surface 96 of the electro-optic output terminals 70.

Figure 5A:
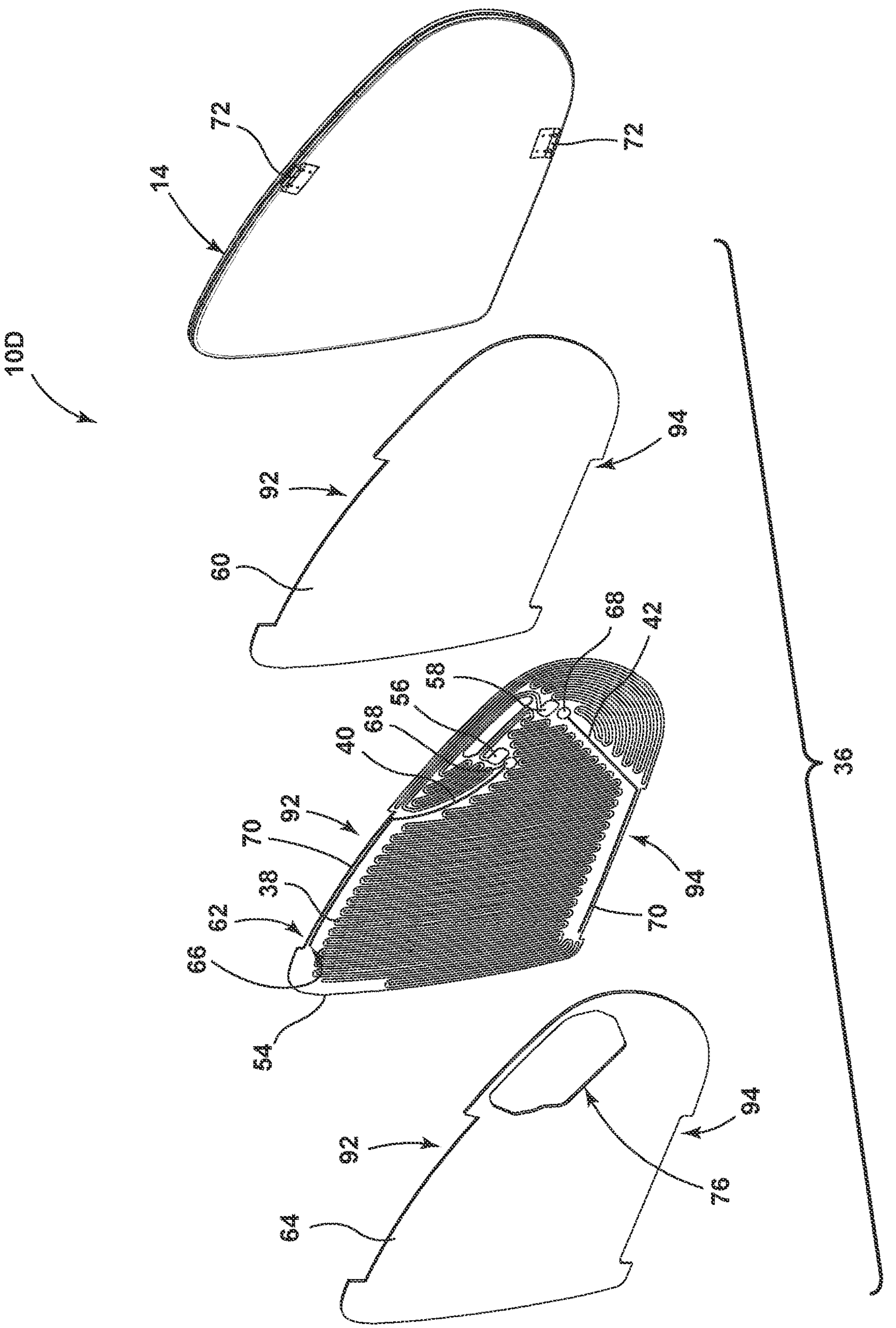
FIG. 5A is a disassembled view of a mirror assembly of a fourth construction in accordance with an aspect of the present disclosure.
Figure 5B:
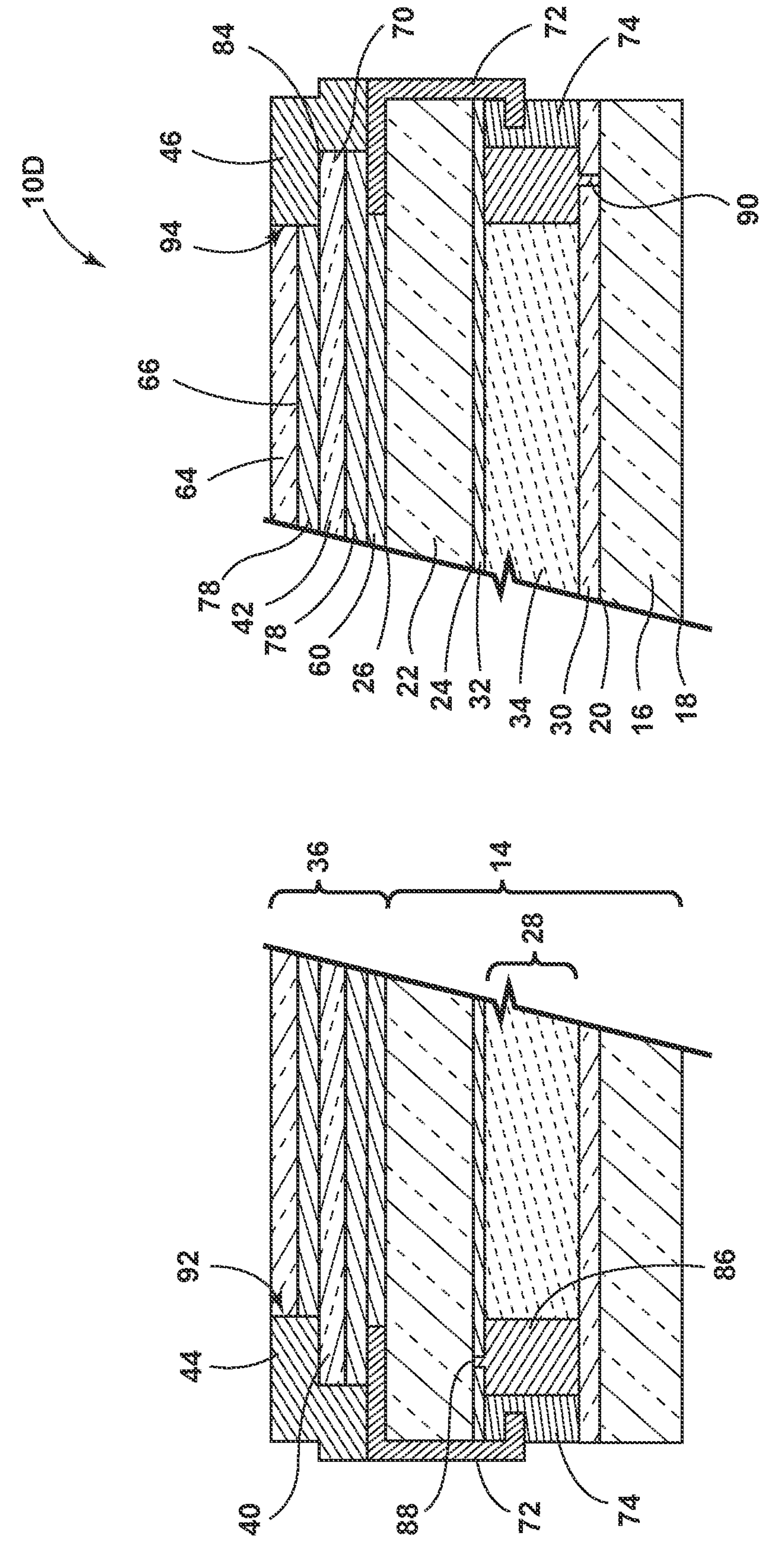
FIG. 5B is a cross-sectional view of a mirror assembly of a fourth construction in accordance with an aspect of the present disclosure.

With reference now to FIGS. 5A and 5B, a mirror assembly 10D is illustrated in accordance with a fourth construction. Unless otherwise expressly indicated, the mirror assembly 10D of the fourth construction may share all the same features, elements, materials, and functionalities, and be incorporated into the same structures as the other constructions described herein. However, the notches 92, 94 may be elongated along the heater assembly 36 and the electro-optic output terminals 70 extend along the notches 92, 94 to function as the bus 74 (e.g., by wrapping electrodes 30, 32 and/or using a conductive intermediary), as such, additional buses may not be needed. More particularly, the electro-optic output terminals 70 and/or conductive intermediaries 44, 46 may extend along at least 40% (e.g., at least 50%, at least 60%, at least 70%, at least 80%, at least 90%) of the outer electrode perimeter. The conductive intermediaries 44, 46 electrically couple the electro-optic output terminals 70 to the first and second electrodes 30, 32 either directly or by the one or more conductive structures (e.g., conductive clips 72 (e.g., a plurality of clips 72 in a sequence or elongated clips 72), buses 74 (e.g., epoxy), conductive springs 55, electrodes 30, 32, and/or the like). The first and second conductive intermediaries 44, 46 may extend between the electro-optic output terminals 70 to the conductive structures, and the conductive structures may connect directly between the electro-optic output terminals 70 and the electrodes 30, 32.

With continued reference to FIGS. 5A and 5B, the notches 92, 94 may each include a larger profile in the second heater substrate 64 than around the electro-optic output terminals 70 such that the conductive intermediaries 44, 46 are in contact with the rear 84 surface of the electro-optic output terminals 70 to facilitate sufficient electric coupling between the conductive intermediaries 44, 46 and the rear surface 84 of the electro-optic output terminals 70. In a similar manner, the notches 92, 94 may each include a larger profile in the second heater substrate 64 than around the electro-optic output terminals 70 such that the conductive intermediaries 44, 46 are in contact with the rear surface 84 of the electro-optic output terminals 70 to further facilitate sufficient electric coupling between the conductive intermediaries 44, 46 and the rear surface 84 of the electro-optic output terminals 70.

Figure 6A:
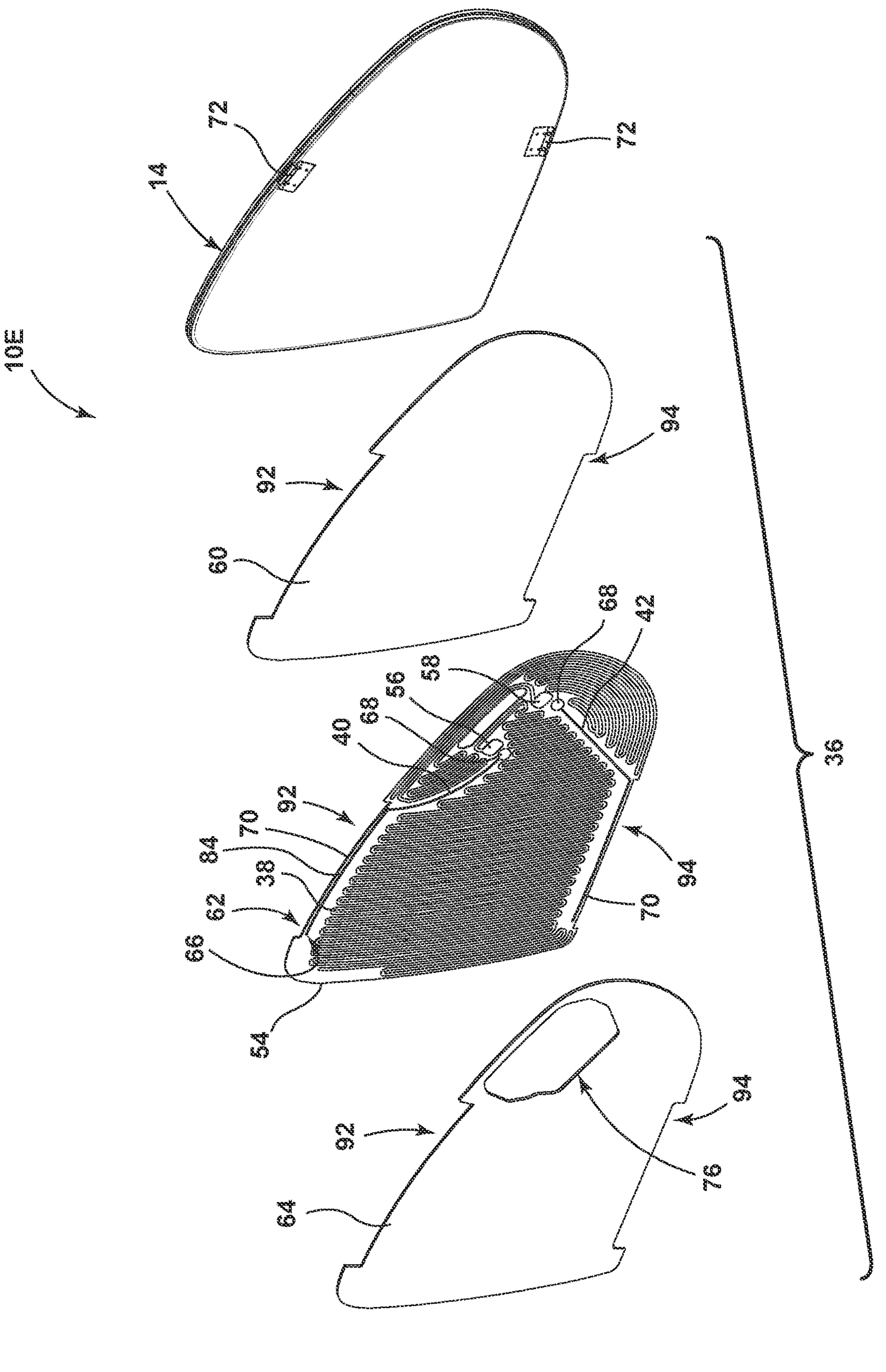
FIG. 6A is a disassembled view of a mirror assembly of a fifth construction in accordance with an aspect of the present disclosure.
Figure 6B:
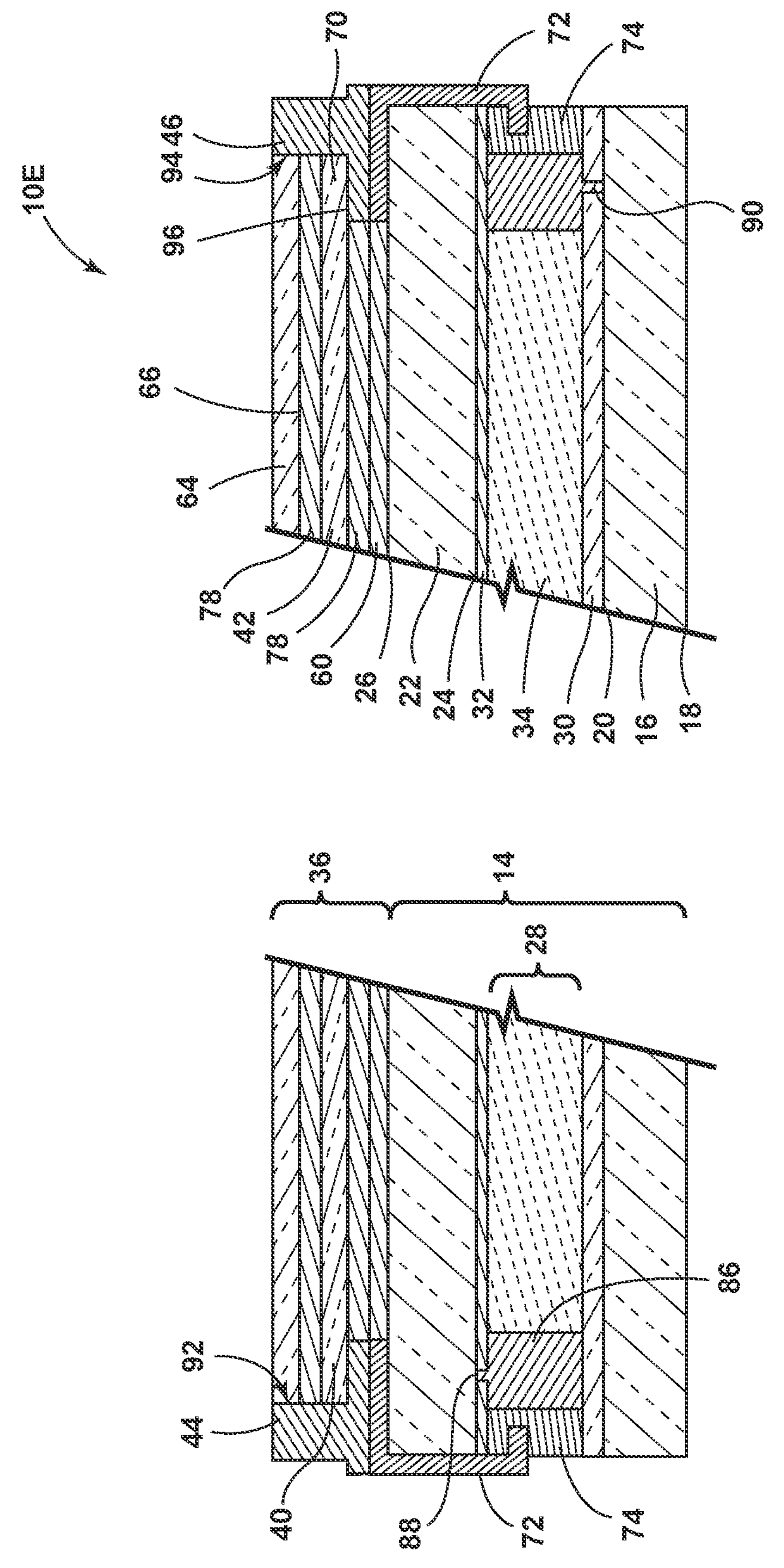
FIG. 6B is a cross-sectional view of a mirror assembly of a fifth construction in accordance with an aspect of the present disclosure.

With reference now to FIGS. 6A and 6B, a mirror assembly 10E is illustrated in accordance with a fifth construction. Unless otherwise expressly indicated, the mirror assembly 10E of the fifth construction may share all the same features, elements, materials, and functionalities, and be incorporated into the same structures as the other constructions described herein. However, the notches 92, 94 may each include a larger profile in the first heater substrate 60 than around the electro-optic output terminals 70 such that the conductive intermediaries 44, 46 are in contact with the front surface 96 of the electro-optic output terminals 70 to facilitate sufficient electric coupling between the conductive intermediaries 44, 46 and the front surface 96 of the electro-optic output terminals 70.

Figure 7B:
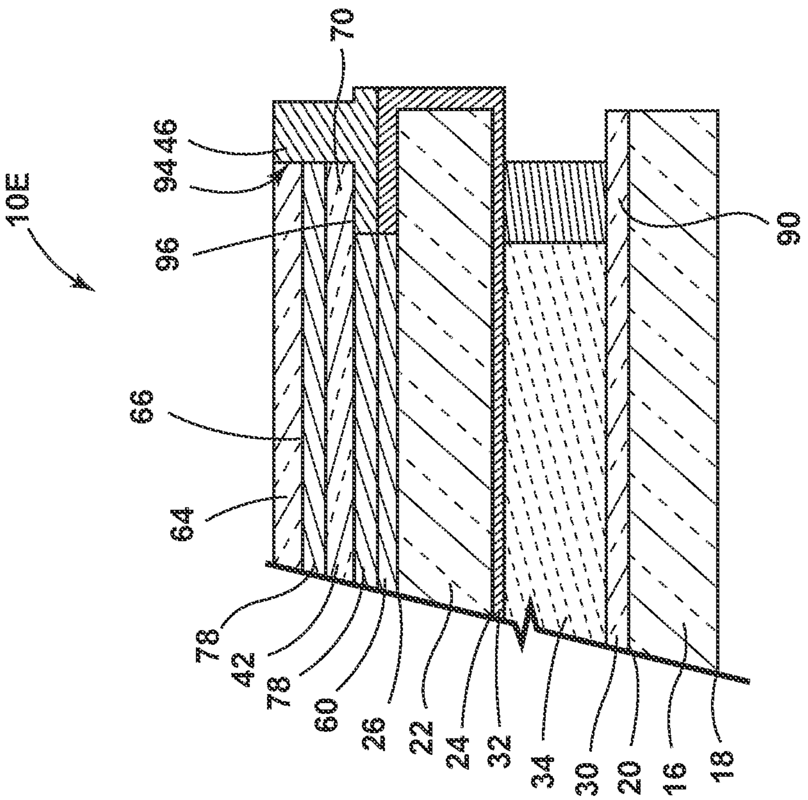
FIG. 7B is a cross-sectional view of a mirror assembly with a modified arrangement of components in accordance with an aspect of the present disclosure.
Figure 7A:
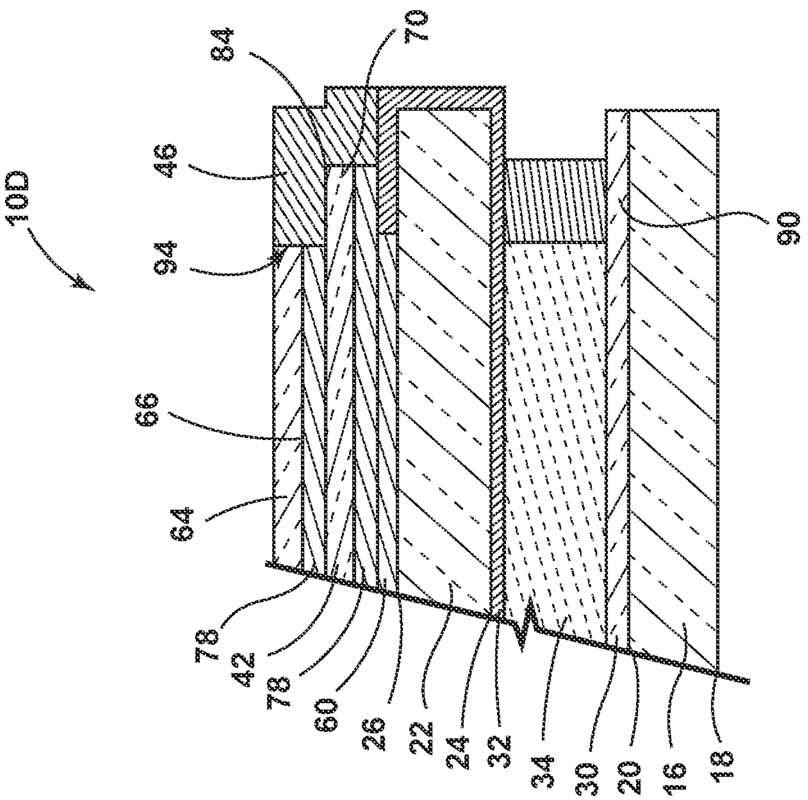
FIG. 7A is a cross-sectional view of a mirror assembly with a modified arrangement of components in accordance with an aspect of the present disclosure.

With reference now to FIGS. 7A and 7B, in some embodiments, the mirror assemblies 10A-10F of the other constructions, such as the mirror assembly 10D, 10E, the electrodes 30, 32 wrap around an outer perimeter of the element substrates 16, 22 and are electrically coupled to the output terminals 70 directly or with the conductive intermediaries 44, 46. The material used for the electrodes 30, 32 may vary along the electrode path. For example, the material of the electrodes 30, 32 outside of seal 86 may be different than the material used inside seal 86. With reference now to FIGS. 5A-7B, it should be appreciated that additional conductive structures may not be included or be otherwise modified. For example, the electro-optic output terminals 70 may connect directly to the electrodes 30, 32 or via the conductive intermediaries 44, 46. In some embodiments, the conductive intermediaries 44, 46 may have a resistance of 2 ohms or less, for example, about 1 ohm or less. In embodiments, where the conductive intermediaries 44, 46 have the recited range of resistance, the bus 74, if present, may be formed of a material other than silver epoxy. For example, a less expensive material with a resistance of 5 ohms or more, about 10 ohms, or 10 ohms or more. In other embodiments, the bus 74 may not be included and the conductive intermediaries 44, 46 directly provide power to the electrodes 30, 32.

Figure 8A:
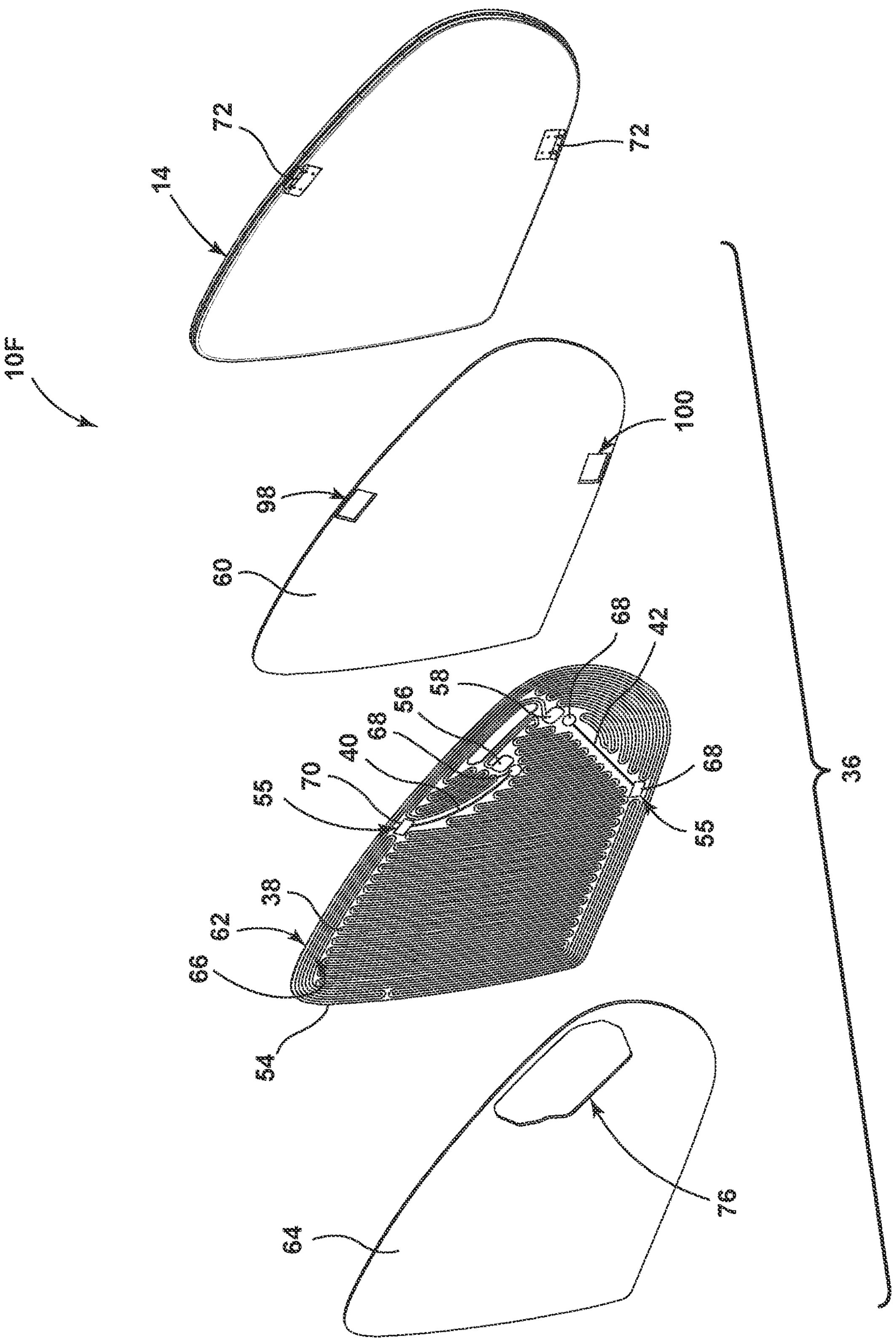
FIG. 8A is a disassembled view of a mirror assembly of a sixth construction in accordance with an aspect of the present disclosure.
Figure 8B:
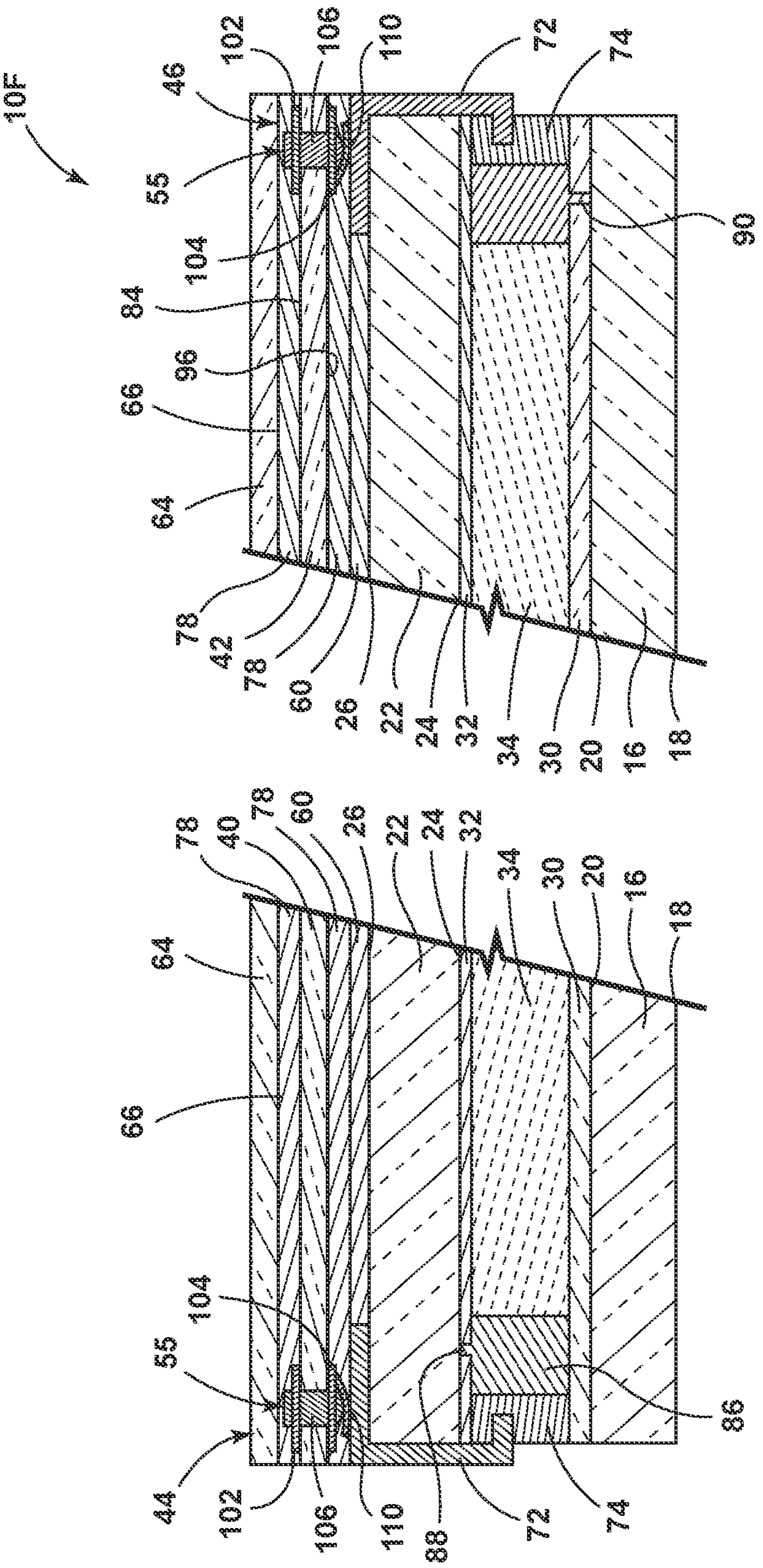
FIG. 8B is a cross-sectional view of a mirror assembly with a modified arrangement of components in accordance with an aspect of the present disclosure.
Figure 8C:
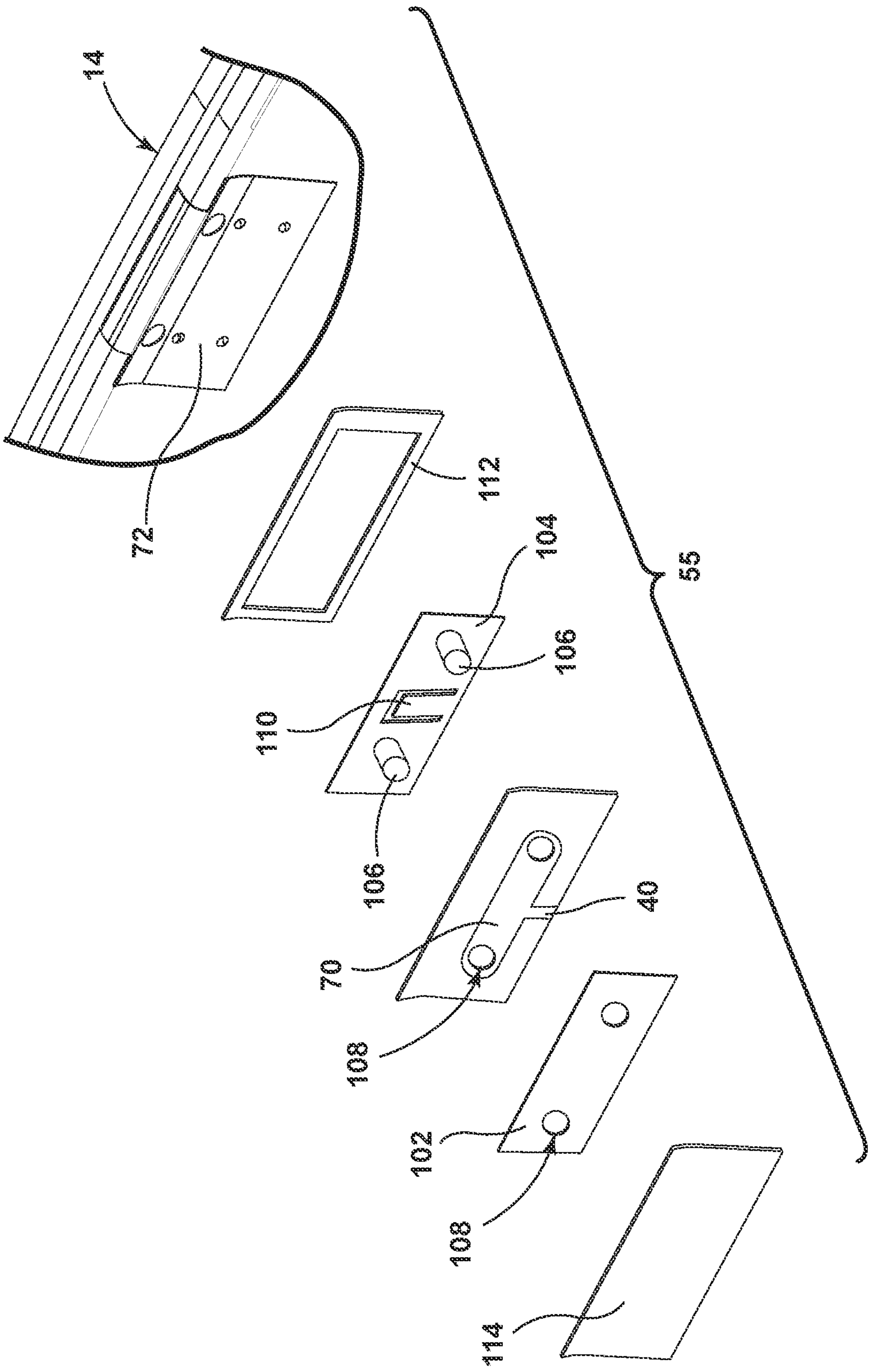
FIG. 8C is a disassembled and partially fragmented view of a conductive clip in accordance with an aspect of the present disclosure.

While the various constructions and arrangements of the mirror assembly 10A-10E may include conductive intermediaries 44, 46 each configured as the conductive spring 55, FIGS. 8A-8C, depict a mirror assembly 10F of a sixth construction. Unless otherwise expressly indicated, the mirror assembly 10F of the sixth construction may share all the same features, elements, materials, and functionalities, and be incorporated into the same structures as the other constructions described herein. The conductive springs 55 may be sandwiched (e.g., biased outwardly) between the electro-optic input and output terminals 68, 70 and at least one of the conductive clips 72, the electrodes 30, 32, buses 74, or other conductive structures. In operation, the conductive springs 55 ultimately remove stress between the electro-optic input and output terminals 68, 70 and the conductive clips 72 (e.g., or other conductive structures) while ensuring contact for transferring power therebetween. The conductive clips 72 may be located in openings 98, 100, which may be similar to or generally the same as one of the vias 80, 82, the notches 92, 94 as previously described. In the mirror assembly 10F depicted in FIG. 8A, the openings 98, 100 are generally larger than the previously described vias 80, 82 to accommodate the size of the conductive clips 72. The openings 98, 100 may be defined by the first heater substrate 60, the second heater substrate 64, and/or the second element substrate 22. In the depicted embodiment in FIGS. 8A and 8B, the second heater substrate 64 defines the openings 98, 100.

With reference now to FIGS. 8B and 8C, the conductive spring 55 includes a rear rivet plate 102 coupled to the rear surface 84 and a front rivet plate 104 coupled to the front surface 96. At least one connector 106 extends through the electro-optic input and output terminals 68, 70, respectively. In the depicted embodiment, the at least one connector 106 includes two pairs of connectors 106, each pair associated with a different one of the electro-optic input and output terminals 68, 70. More particularly, the rear rivet plate 102 and the front rivet plate 104 may define a pair of holes 108 for accommodating the connectors 106. The holes 108 may further extend through both the electro-optic input and output terminals 68, 70. In this manner, the electro-optic input and output terminals 68, 70 may be effectively sandwiched between both rivet plates 102, 104. The connectors 106 are depicted as rivets, which may be formed of conductive material. The front rivet plate 104 is coupled to, connected to, and/or is integral with a spring member 110. In the depicted embodiment, the spring element 110 is configured as a leaf spring integral with the front rivet plate 104. However, the spring element 110 may have other configurations, such as a helical spring, a pogo pin, and/or the like. In some embodiments, power provided to the electro-optic input and output terminals 68, 70 may be transferred through the connectors 106 between the rear rivet plate 102 and the front rivet plate 104 to the spring element 110. In some embodiments, the front rivet plate 104 is directly or indirectly (e.g., with a conductive member or intermediary) coupled to the front surface 96 and power provided to the electro-optic input and output terminals 68, 70 travels from the front rivet plate 104 to the spring element 110.

With reference now specifically to FIG. 8C, a disassembled and partially fragmented view of the conductive spring 55 is depicted. The conductive spring 55 may further include a bonding element 112 (e.g., adhesive, tape, foam) bonded between the front rivet plate 104 to at least one of the conductive clips 72, the electrodes 30, 32, buses 74, or other conductive structures. A carrier foam 114 may substantially cover and/or insulate the rear rivet plate 102. The electro-optic input and output terminals 68, 70 in the mirror assembly 10F are each branched, defining the openings 98, 100 that receive the connectors 106.

With reference now to FIGS. 1-8C, it should be appreciated that, in some embodiments, no traditional wires may be present in the conduction loop between the electro-optic assembly 14 and the conductive traces 40, 42. In this manner, packaging and assembly can be simplified. It should also be appreciated that the conductive traces 40, 42 may extend to the outer perimeter 54, such as the notches 92, 94 (which may be located in one or both heater substrates 60, 64). In addition, it should be appreciated that, unless otherwise indicated, the conductive traces 40, 42 may extend to the outer perimeter 54 and the outer perimeter 54 may not include any notches 92, 94. The conductive traces 40, 42 may extend from a central region of the heater assembly 36 to the outer perimeter 54 as shown in FIGS. 1-8C.

With continued reference to FIGS. 1-8C, it is contemplated that the heating assembly 36 may be configured as a positive temperature coefficient ("PTC") heater. In such embodiments, the heating trace 38 is configured as one or more electrical buses with traces split into multiple interdigitated pathways (e.g., a positive and a negative bus with positive and negative branches). For example, the heating trace 38 may look interdigitated like a pair of combs where the teeth are parallel to each other, but not touching. The traces are applied to the top of a PTC material (e.g., substrate) that has a lower resistance at cold and room temperatures, but where the resistance increases significantly at higher temperatures. The result is that current flows from one trace at, for example, 13 V, through the PTC material, to the other trace at ground. Most of the heat is generated in the resistive PTC material. Once the PTC material is hot, the current drops and the power of the heater drops with it. In embodiments that utilize the PTC heater configuration, it should be appreciated that the same connection schemes described in reference to the mirror assemblies 10A-10F can be utilized. However, in such embodiments, the PTC material is conductive, and the higher voltage of the heating trace may damage the electro-optic assembly 14 because the electro-optic assembly 14 is electrically coupled to the high voltage heater (e.g., heating assembly 36 with PTC material). One solution to this problem would be to electrically isolate the conductive traces 40, 42 of the electro-optic assembly 14 from the heater trace. Electrical isolation will prevent unwanted communication between the heater traces and the conductive traces 40, 42. The downside to electrical isolation is the area around the conductive traces 40, 42 will not be heated.

The disclosure herein is further summarized in the following paragraphs and is further characterized by combinations of any and all of the various aspects described therein.

According to one aspect of the present disclosure, a mirror assembly for a vehicle includes an electro-optic assembly that has a front element substrate having a first surface and a second surface opposite the first surface. The electro-optic assembly further has a second element substrate having a third surface and a fourth surface opposite the third surface, the second and third surfaces facing each other to define a gap. A first electrode is coupled to the second surface and a second electrode is coupled to the third surface. An electro-optic medium is located between the first electrode and the second electrode. The mirror assembly further includes a heating assembly that defines an outer perimeter including a pair of conductive pathways, each of the conductive pathways includes one of a via located within the outer perimeter and extending entirely through the heating assembly or a notch defined by the outer perimeter. A heating trace distributes warmth along an area of the heating assembly. A first conductive trace and a second conductive trace each extend to one of the conductive pathways. A first conductive intermediary is located in one of the conductive pathways and electrically couples the first conductive trace to the first electrode and a second conductive intermediary is located in the other of the conductive pathways and electrically couples the second conductive trace to the second electrode.

According to another aspect, a pair of conductive traces extend to an outer perimeter of a heating assembly and a pair of conductive intermediaries wrap around the outer perimeter of the heating assembly.

According to yet another aspect, an outer perimeter defines a pair of notches, and a first and second conductive intermediary wraps around the outer perimeter within one of the notches, respectively.

According to still another aspect, a heater assembly includes a first heater substrate overlaying a front surface of a heating trace and conductive traces and a second heater substrate overlaying a rear surface of a heating trace and conductive traces.

According to still yet another aspect, a notch is defined by at least one of a first heater substrate and a second heater substrate.

According to another aspect, a pair of conductive intermediaries overlay a front surface of conductive traces within a notch.

According to yet another aspect, a pair of conductive intermediaries overlay a rear surface of conductive traces within a notch.

According to still another aspect, a pair of conductive traces and a pair of conductive intermediaries each extend along at least at least 50% of an outer perimeter of the electrodes.

According to still yet another aspect, at least one of a first conductive intermediary and a second conductive intermediary is a spring element.

According to another aspect, each of a pair of conductive traces extends to a pair of vias, respectively, and extend through a heating assembly and a conductive intermediary is located in each of the vias.

According to yet another aspect, a pair of conductive intermediaries overlay a front surface of a pair of conductive traces within a pair of vias.

According to another aspect of the disclosure, a pair of conductive intermediaries overlay a rear surface of a pair of conductive traces within a pair of vias.

According to still yet another aspect, at least one of a first and second electrode wraps around an edge of a front substrate into electric coupling with a first or second conductive intermediary.

According to another aspect of the present disclosure, a mirror assembly for a vehicle includes an electro-optic assembly that has a front element substrate having a first surface and a second surface opposite the first surface. The electro-optic assembly further has a second element substrate having a third surface and a fourth surface opposite the third surface, the second and third surfaces facing each other to define a gap. A first electrode is coupled to the second surface and a second electrode is coupled to the third surface. An electro-optic medium is located between the first electrode and the second electrode. The mirror assembly further includes a heating assembly that defines an outer perimeter including a pair of conductive pathways, each of the conductive pathways includes one of a via or an opening. A heating trace distributes warmth along an area of the heating assembly. A first conductive trace and a second conductive trace each extend to one of the conductive pathways. A first conductive intermediary is located in one of the conductive pathways and electrically couples the first conductive trace to the first electrode and a second conductive intermediary is located in the other of the conductive pathways and electrically couples the second conductive trace to the second electrode.

According to another aspect, a first and a second conductive intermediary include conductive springs located in openings, the conductive springs electrically coupled to conductive pathways and biased towards a first and second electrode.

According to yet another aspect, a conductive spring is electrically coupled to a conductive clip.

According to yet another aspect of the present disclosure, a mirror assembly for a vehicle includes an electro-optic assembly that has a front element substrate having a first surface and a second surface opposite the first surface. The electro-optic assembly further has a second element substrate having a third surface and a fourth surface opposite the third surface, the second and third surfaces facing each other to define a gap. A first electrode is coupled to the second surface and a second electrode is coupled to the third surface. An electro-optic medium is located between the first electrode and the second electrode. The mirror assembly further includes a heating assembly that defines an outer perimeter including a pair of conductive pathways. A heating trace distributes warmth along an area of the heating assembly. A first conductive trace and a second conductive trace each extend to one of the conductive pathways. A first conductive intermediary is located in one of the conductive pathways and electrically couples the first conductive trace to the first electrode and a second conductive intermediary is located in the other of the conductive pathways and electrically couples the second conductive trace to the second electrode.

According to another aspect, at least one of a first and a second electrode wraps around an edge of a front substrate into electric coupling with a first or a second conductive intermediary.

According to yet another aspect, a pair of conductive pathways includes a pair of notches defined by an outer perimeter of a heating assembly, and conductive intermediaries wrap around the outer perimeter within one of the notches, respectively.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term “coupled” (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

As used herein, the term “about” means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term “about” is used in describing a value or an end-point of a range, the disclosure should be understood to include the specific value or end-point referred to. Whether or not a numerical value or end-point of a range in the specification recites “about,” the numerical value or end-point of a range is intended to include two embodiments: one modified by “about,” and one not modified by “about.” It will be further understood that the end-points of each of the ranges are significant both in relation to the other end-point, and independently of the other end-point.

The terms “substantial,” “substantially,” and variations thereof as used herein are intended to note that a described feature is equal or approximately equal to a value or description. For example, a “substantially planar” surface is intended to denote a surface that is planar or approximately planar. Moreover, “substantially” is intended to denote that two values are equal or approximately equal. In some embodiments, “substantially” may denote values within about 10% of each other, such as within about 5% of each other, or within about 2% of each other.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connectors or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A mirror assembly for a vehicle comprising:
an electro-optic assembly comprising:
a front element substrate having a first surface and a second surface opposite the first surface;
a second element substrate having a third surface and a fourth surface opposite the third surface, the second and third surfaces facing each other to define a gap;
a first electrode coupled to the second surface;
a second electrode coupled to the third surface; and
an electro-optic medium located between the first electrode and the second electrode;
a heating assembly comprising:
an outer perimeter including a pair of conductive pathways, each of the conductive pathways including at least one of a via or an opening located within the outer perimeter and extending entirely through the heating assembly or a notch defined by the outer perimeter;
a heating trace distributing warmth along an area of the heating assembly;
a first conductive trace and a second conductive trace each extending to one of the conductive pathways; and
a first conductive intermediary located in one of the conductive pathways and electrically coupling the first conductive trace to the first electrode; and
a second conductive intermediary located in the other of the conductive pathways and electrically coupling the second conductive trace to the second electrode.

2. The mirror assembly of claim 1, wherein the conductive traces extend to the outer perimeter of the heating assembly and the conductive intermediaries wrap around the outer perimeter of the heating assembly.

3. The mirror assembly of claim 2, wherein the pair of conductive pathways includes a pair of notches, and the conductive intermediaries wrap around the outer perimeter within one of the notches, respectively.

4. The mirror assembly of claim 3, wherein the heating assembly further comprises:
a first heater substrate overlaying a front surface of the heating trace and conductive traces; and
a second heater substrate overlaying a rear surface of the heating trace and conductive traces.

5. The mirror assembly of claim 4, wherein the notches are defined by at least one of the first heater substrate and the second heater substrate.

6. The mirror assembly of claim 5, wherein the conductive intermediaries overlay the front surface of the conductive traces within the notch.

7. The mirror assembly of claim 5, wherein the conductive intermediaries overlay the rear surface of the conductive traces within the notch.

8. The mirror assembly of claim 5, wherein the conductive traces and the conductive intermediaries each extend along at least 50% of an outer perimeter of the electrodes.

9. The mirror assembly of claim 8, wherein at least one of the first conductive intermediary and the second conductive intermediary is a spring element.

10. The mirror assembly of claim 1, wherein the pair of conductive pathways includes a pair of vias extending through the heating assembly and the conductive intermediaries are located in each of the vias.

11. The mirror assembly of claim 10, wherein the conductive intermediaries overlay a front surface of the conductive traces within the vias.

12. The mirror assembly of claim 11, wherein the conductive intermediaries overlay a rear surface of the conductive traces within the vias.

13. The mirror assembly of claim 1, wherein at least one of the first and second electrodes wraps around an edge of the front substrate into electric coupling with the first or second conductive intermediary.

14. A mirror assembly for a vehicle comprising:
an electro-optic assembly comprising:
a front element substrate having a first surface and a second surface opposite the first surface;
a second element substrate having a third surface and a fourth surface opposite the third surface, the second and third surfaces facing each other to define a gap;
a first electrode coupled to the second surface;
a second electrode coupled to the third surface; and
an electro-optic medium located between the first electrode and the second electrode;
a heating assembly comprising:
an outer perimeter including a pair of conductive pathways, each of the conductive pathways including one of a notch defined by the outer perimeter, a via or an opening;
a heating trace distributing warmth along an area of the heating assembly;
a first conductive trace and a second conductive trace each extending to one of the conductive pathways; and
a first conductive intermediary located in one of the conductive pathways and electrically coupling the first conductive trace to the first electrode; and a second conductive intermediary located in the other of the conductive pathways and electrically coupling the second conductive trace to the second electrode.

15. The mirror assembly of claim 14, wherein the first and second conductive intermediaries include conductive springs located in the openings, the conductive springs electrically coupled to the conductive pathways and biased towards the first and second electrodes.

16. The mirror assembly of claim 15, wherein the conductive spring is electrically coupled to a conductive clip.

17. The mirror assembly of claim 14, wherein the pair of conductive pathways includes a pair of vias extending through the heating assembly and the conductive intermediaries are located in each of the vias.

18. A mirror assembly for a vehicle comprising:

an electro-optic assembly comprising:

a front element substrate having a first surface and a second surface opposite the first surface;

a second element substrate having a third surface and a fourth surface opposite the third surface, the second and third surfaces facing each other to define a gap;

a first electrode coupled to the second surface;

a second electrode coupled to the third surface; and an electro-optic medium located between the first electrode and the second electrode;

a heating assembly comprising:

an outer perimeter including a pair of conductive pathways;

a heating trace distributing warmth along an area of the heating assembly;

a first conductive trace and a second conductive trace each extending to one of the conductive pathways; and a first conductive intermediary located in one of the conductive pathways and electrically coupling the first conductive trace to the first electrode; and a second conductive intermediary located in the other of the conductive pathways and electrically coupling the second conductive trace to the second electrode.

19. The mirror assembly of claim 18, wherein at least one of the first and second electrodes wraps around an edge of the front substrate into electric coupling with the first or second conductive intermediary.

20. The mirror assembly of claim 18, wherein the pair of conductive pathways includes a pair of notches defined by the outer perimeter of the heating assembly, and the conductive intermediaries wrap around the outer perimeter within one of the notches, respectively.

* * * * *